(12) United States Patent
Isoda et al.

(10) Patent No.: US 7,223,991 B2
(45) Date of Patent: May 29, 2007

(54) RADIATION IMAGE STORAGE PANEL

(75) Inventors: Yuji Isoda, Ashigara-kami-gun (JP);
Hiroshi Matsumoto, Ashigara-kami-gun (JP)

(73) Assignee: Fujifilm Corporation, Tokyo (JP)

( * ) Notice: Subject to any disclaimer, the term of this patent is extended or adjusted under 35 U.S.C. 154(b) by 0 days.

(21) Appl. No.: 11/374,211

(22) Filed: Mar. 14, 2006

(65) Prior Publication Data
US 2006/0208208 A1 Sep. 21, 2006

(30) Foreign Application Priority Data
Mar. 14, 2005 (JP) ............... 2005-071954

(51) Int. Cl.
*G03B 42/08* (2006.01)
(52) U.S. Cl. .................................... 250/581
(58) Field of Classification Search ............... 250/580, 250/581, 584
See application file for complete search history.

(56) References Cited

U.S. PATENT DOCUMENTS

| | | | |
|---|---|---|---|
| 5,017,440 A * | 5/1991 | Bills et al. ................ 428/690 |
| 7,070,916 B2 * | 7/2006 | Maezawa et al. ........... 430/496 |
| 2003/0143523 A1 * | 7/2003 | Kato et al. .................... 435/4 |
| 2003/0153070 A1 * | 8/2003 | Nakajima et al. ......... 435/287.2 |
| 2005/0077479 A1 | 4/2005 | Isoda et al. |
| 2005/0133731 A1 * | 6/2005 | Matsumoto et al. ..... 250/484.4 |

FOREIGN PATENT DOCUMENTS

JP 2003-50298 2/2003

* cited by examiner

*Primary Examiner*—Constantine Hannaher
(74) *Attorney, Agent, or Firm*—Sughrue Mion, PLLC

(57) ABSTRACT

A radiation image storage panel has a phosphor layer composed of a phosphor matrix compound and an activator in combination, a subbing layer composed of the phosphor matrix compound, and a support, in which both of the subbing layer and phosphor layer have been formed by a gas phase-accumulation method and in which the subbing layer has a relative density of 60% to 98%, and a surface of the support in contact with the subbing layer shows a contact angle of less than 50° to water.

11 Claims, 1 Drawing Sheet

RADIATION IMAGE STORAGE PANEL

FIELD OF THE INVENTION

The present invention relates to a radiation image storage panel favorably employable in a radiation image recording and reproducing method utilizing an energy-storing phosphor.

BACKGROUND OF THE INVENTION

When exposed to radiation such as X-rays, an energy-storing phosphor (e.g., stimulable phosphor, which gives off stimulated emission) absorbs and stores a portion of the radiation energy. The phosphor then emits stimulated emission according to the level of the stored energy when exposed to electromagnetic wave such as visible or infrared light (i.e., stimulating light). A radiation image recording and reproducing method utilizing the energy-storing phosphor has been widely employed in practice. In that method, a radiation image storage panel, which is a sheet comprising the energy-storing phosphor, is used. The method comprises the steps of: exposing the storage panel to radiation having passed through an object or having radiated from an object, so that radiation image information of the object is temporarily recorded in the panel; sequentially scanning the panel with stimulating light such as a laser beam to emit stimulated light; and photoelectrically detecting the emitted light to obtain electric image signals. The storage panel thus treated is subjected to a step for erasing radiation energy remaining therein, and then stored for the use in the next recording and reproducing procedure. Thus, the radiation image storage panel can be repeatedly used.

The radiation image storage panel (often referred to as energy-storing phosphor sheet) has a basic structure comprising a support and a phosphor layer provided thereon. However, if the phosphor layer is self-supporting, the support may be omitted. Further, a protective layer is normally provided on the free surface (surface not facing the support) of the phosphor layer so as to keep the phosphor layer from chemical deterioration or physical damage.

Various kinds of energy-storing phosphor layers are known. For example, the phosphor layer can comprise a binder and energy-storing phosphor particles dispersed therein, or otherwise can comprise agglomerate of an energy-storing phosphor without binder. The latter layer can be formed, for example, by a gas phase-accumulation method, in which a phosphor or material thereof is vaporized or sputtered so that the phosphor may be deposited and accumulated on a substrate to form a layer of the phosphor in the form of columnar crystals. The phosphor layer thus formed by a gas phase-accumulation method contains no binder and consists of only the phosphor, and there are gaps among the columnar crystals of the phosphor. Because of the gaps, the stimulating light can stimulate the phosphor efficiently and the emitted light can be collected efficiently, too. Accordingly, a storage panel having that accumulated phosphor layer has high sensitivity. At the same time, since the gaps prevent the stimulating light from diffusing parallel to the layer, the storage panel can give a reproduced image of high sharpness.

The radiation image recording and reproducing method (or radiation image forming method) has various advantages as described above. However, it is still desired that the radiation image storage panel used in the method have as high sensitivity as possible and, at the same time, give a reproduced radiation image of as high quality (in regard to sharpness and graininess) as possible.

JP-A-2003-050298 discloses a process for preparation of a radiation image storage panel. In the disclosed process, first a subbing layer made of a phosphor matrix compound in the form of columnar crystals is formed on a support by a gas phase-accumulation method, and then a phosphor layer composed of the matrix compound and an activator in the form of columnar crystals is formed on the subbing layer (so that each columnar crystal of the phosphor can grow on each columnar crystal of the phosphor matrix compound), to prepare a phosphor layer excellent in columnar crystallinity. The columnar phosphor crystals in the formed phosphor layer are partly fused and combined with the matrix columnar crystals in the subbing layer.

It has been found that, if the phosphor comprises an additive (such as activator) and a matrix compound in a particular combination (particularly, alkali metal halide stimulable phosphors such as CsBr:Eu), the phosphor layer directly formed on a support (or substrate) by a gas phase-accumulation method is often poor in adhesion to the support and hence is liable to separate from the substrate. Particularly, if the phosphor is vaporized, deposited and accumulated under a medium vacuum (0.1 to 10 Pa) by means of a resistance heater, the formed phosphor layer is poor in adhesion to the support.

SUMMARY OF THE INVENTION

The applicants have already proposed a radiation image storage panel comprising a support, a phosphor layer, and a subbing layer provided between them (U.S. Ser. No. 10/943, 929). The subbing layer has a lower relative density than the phosphor layer, and the relative density of the subbing layer preferably is in the range of 80 to 98% so as to impart an increased sensitivity to the radiation image storage panel.

According to further study, the applicants noted that the subbing layer having an extremely high relative density sometimes shows poor adhesion to the support.

It is an object of the present invention to provide a radiation image storage panel which shows high sensitivity and high bonding strength between the phosphor layer and the support.

The applicants have found that enough bonding strength between the phosphor layer and the support can be provided by increasing wettability (surface energy) of the support surface. The applicants further have found that a satisfactorily high sensitivity can be obtained even when the relative density of the subbing layer is in the range of 60% to 80%, and a radiation image storage panel showing a good balance in the sensitivity and bonding strength between the phosphor layer and the support can be provided when the relative density of the subbing layer is adjusted to the range of 60% to 80% and a contact angle of the support surface to water is adjusted to a value of less than 50°.

The present invention resides in a radiation image storage panel comprising a phosphor layer composed of a phosphor matrix compound and an activator in combination, a subbing layer composed of the phosphor matrix compound, and a support in order, the subbing layer and phosphor layer having been formed by a gas phase-accumulation method, wherein the subbing layer has a relative density of 60% to 98%, and a surface of the support facing the subbing layer shows a contact angle of less than 50° to water The term "relative density (%)" in the invention means a relative value of density of each layer (subbing layer and phosphor layer) based on the inherent density of the phosphor. The subbing layer can consist essentially of only a phosphor matrix compound, but may contain an activator, additives or other impurities in an amount of less than 0.1 wt. % based on the total weight of the subbing layer under the condition that the amounts are less than the amount of the activator contained in the phosphor layer.

The radiation image storage panel of the invention can be produced by the process comprising the steps of: vaporizing and accumulating a matrix compound of phosphor, by a gas phase-accumulation method, on a support surface showing a contact angle of less than 50° to water, to form a subbing layer having a relative density of 60 to 98%; and then vaporizing and accumulating the phosphor on the formed subbing layer by a gas phase-accumulation method.

The radiation image storage panel of the invention is excellent in adhesion between the support and the subbing layer, and the subbing layer functions as a stress-relaxing layer effectively enough to remarkably improve the adhesion between the phosphor layer and the support. Further, since the subbing layer also improves columnar crystallinity of the phosphor layer, the amount of emission is increased to improve the sensitivity of the storage panel. The radiation image storage panel of the invention is, therefore, excellent in durability, and hence can be satisfactorily used for radiographic diagnosis while keeping high quality for a long time.

DETAILED DESCRIPTION OF THE INVENTION

Preferred embodiments of the invention are as follows.

(1) The subbing layer has a relative density lower than the phosphor layer.

(2) The subbing layer has a relative density of 60% to 96%.

(3) The subbing layer has a relative density of 60% to 80%.

(4) The subbing layer has a thickness satisfying the condition of:

0.01<(thickness of subbing layer/thickness of phosphor layer)<0.5.

(5) The subbing layer is formed according to a gas phase-accumulation method.

(6) The surface of the support facing the subbing layer shows a contact angle (to water) of less than 20°.

(7) The phosphor is an energy-storing phosphor, preferably an alkali metal halide stimulable phosphor represented by the following formula (I):

$$M^{I}X \cdot aM^{II}X'_2 \cdot bM^{III}X''_3 : zA \quad (I)$$

in which $M^{I}$ is at least one alkali metal selected from the group consisting of Li, Na, K, Rb and Cs; $M^{II}$ is at least one alkaline earth metal or divalent metal selected from the group consisting of Be, Mg, Ca, Sr, Ba, Ni, Cu, Zn and Cd; $M^{III}$ is at least one rare earth element or trivalent metal selected from the group consisting of Sc, Y, La, Ce, Pr, Nd, Pm, Sm, Eu, Gd, Tb, Dy, Ho, Er, Tm, Yb, Lu, Al, Ga and In; each of X, X' and X" is independently at least one halogen selected from the group consisting of F, Cl, Br and I; A is at least one rare earth element or metal selected from the group consisting of Y, Ce, Pr, Nd, Sm, Eu, Gd, Tb, Dy, Ho, Er, Tm, Yb, Lu, Mg, Cu and Bi; and a, b and z are numbers satisfying the conditions of $0 \leq a < 0.5$, $0 \leq b < 0.5$ and $0 < z < 1.0$, respectively.

(8) In the formula (I), $M^{I}$, X, A and z are Cs, Br, Eu and a number satisfying the condition of $1 \times 10^{-4} \leq z \leq 0.1$, respectively.

In the manufacture the storage panel of the invention, it is preferred to form the subbing and phosphor layers successively. Further, the subbing and phosphor layers are preferably formed according to a vapor-deposition method under a medium vacuum of 0.1 to 10 Pa.

The radiation image storage panel of the invention is explained below in detail with reference to the attached drawings.

Figure 1:
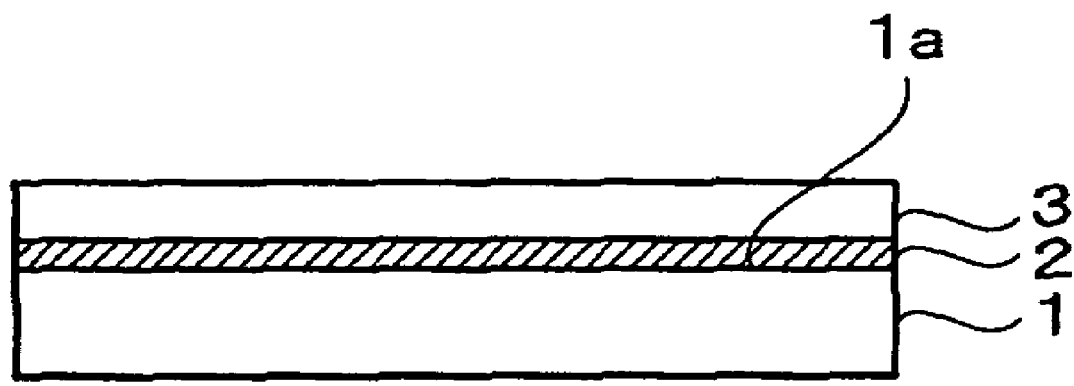
FIG. 1 is a sectional view schematically illustrating an example of the constitution of radiation image storage panel according to the invention.
Figure 2:
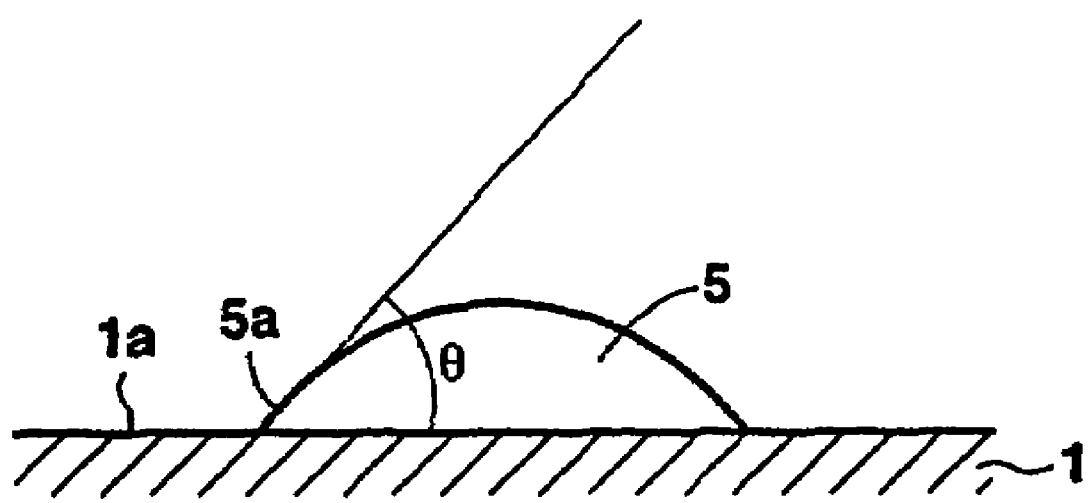
FIG. 2 is a sectional view schematically illustrating a contact angle (to water) of the support surface.

FIG. 1 is a sectional view schematically illustrating an example of the constitution of radiation image storage panel according to the invention, and FIG. 2 is a sectional view schematically illustrating a contact angle (to water) of the support surface.

In FIG. 1, the radiation image storage panel comprises a support (substrate) 1, a subbing layer 2 and a phosphor layer 3 laminated in order. The phosphor layer 3 is formed according to a gas phase-accumulation method, and consists essentially of an accumulated phosphor composed of a matrix compound and an activator.

In the invention, as illustrated in FIG. 2, an angle θ between the surface 5a of water drop 5 and the surface 1a of the support 1 (i.e., a contact angle to water of the support surface 1a) is smaller than 50°, preferably smaller than 20°.

The support 1 of the invention is preferably a sheet of aluminum or glass. The surface 1a of the support facing the subbing layer may be covered with a thin film containing metal oxide (e.g., $Al_2O_3$). In order to make the support surface show an acute contact angle to water, the support (or the thin film if provided) is preferably subjected to surface activating treatment (such as a combination of a degreasing treatment with an alkaline solution and plasma discharge treatment) as described later.

In the invention, the surface energy of the support surface is increased so that the contact angle θ to water can be acute and so that the wettability of the support surface can be enhanced, and thereby the phosphor matrix compound (constituting the subbing layer) can be strongly fixed thereon when it is produced by a gas-accumulation method.

The subbing layer 2 comprises a matrix compound of phosphor constituting the phosphor layer 3. The subbing layer 2 may contain a small amount of an activator, additives or other impurities. The relative density of the subbing layer is in the range of 60% to 98%, preferably in the range of 60% to 96%, more preferably in the range of 60% to 80%. The subbing layer 2 preferably has a relative density lower than the phosphor layer 3.

The subbing layer 2 and the phosphor layer 3 preferably have thicknesses satisfying the condition of: 0.01<(thickness of subbing layer/thickness of phosphor layer)<0.5.

For example, if the thickness of the phosphor layer 3 is 500 μm (which is a representative thickness), the subbing layer 2 preferably has a thickness of 5 to 250 μm. The above-mentioned thickness ratio more preferably is in the range of 0.01 to 0.25 (which means the subbing layer has a thickness of 5 to 125 μm if the thickness of the phosphor layer is 500 μm).

The subbing layer 2 as well as the phosphor layer 3 is formed according to a gas phase-accumulation method such as a vapor-deposition process. The subbing layer is generally made of columnar crystals or agglomerate of spherical crystals having diameters of several microns.

There are gaps among the matrix crystals in the subbing layer 2, and the subbing layer 2 has a specific void volume. Because of the gaps and void volume, the subbing layer placed between the support and the phosphor layer can relax stress, particularly, thermal stress which is frequently applied to the storage panel. In addition, since the subbing layer contains little additives such as an activator, the support and the subbing layer are strongly combined with each other. Consequently, the subbing layer can effectively prevent the phosphor layer from separating from the support. Further, the subbing layer constituted of columnar crystals or agglomerate of spherical crystals improves columnar crystallinity of the phosphor layer formed thereon, so that the amount of emission is increased to improve the sensitivity of the storage panel.

The radiation image storage panel of the invention is by no means restricted to the example shown in FIG. 1, and may have, for example, a protective layer and/or various other auxiliary layers as described later.

In the following description, the process for preparation of the storage panel of the invention is explained in detail, by way of example, in the case where the phosphor is an energy-storing phosphor and where a vapor deposition process of resistance-heating type is adopted as the gas phase-accumulation method.

The substrate on which the vapor is deposited is generally used as a support of the radiation image storage panel, and hence can be optionally selected from known materials conventionally proposed for the support of radiation image storage panels. The substrate is preferably a sheet of quartz glass, sapphire glass; metal such as aluminum, iron, tin or chromium; or heat-resistant resin such as aramide. Particularly preferred is a glass sheet or an aluminum sheet. In order to promote growth of the columnar crystals, a great number of very small convexes or concaves may be provided on the substrate surface on which the vapor is deposited.

Further, a thin film containing metal oxide can be formed on the deposited-side surface of the substrate. Examples of the metal oxides include $Al_2O_3$, $SiO_2$, $TiO_2$ and oxide of the metal used as the material of the substrate. The thin film can be formed according to a vapor-deposition process, a sputtering process, an ion-plating process, or a wet-coating process. Otherwise, if the substrate is made of metal, the substrate surface may be subjected to an oxidation treatment such as anodic oxidation. The anodic-oxidized thin film has a great number of fine pores. In consideration of increased wettability, it is preferred not to seal the pores (for example, not to fill the pores in with metal oxide).

In the invention, the substrate surface (or the thin film if provided) on which the vapor is deposited is beforehand subjected to a surface activating treatment so that the contact angle to water can be less than 50°. For example, the substrate surface can be subjected to plasma discharge treatment in an inert gas such as Ar gas. Preferably, the substrate surface is subjected to degreasing treatment with an alkaline solution containing a surface active agent prior to the plasma discharge treatment. For example, in the pre-treatment, the substrate is washed with or immersed in the alkaline solution. Other known surface cleaning and/or activating treatments can be optionally used in a combination.

The energy-storing phosphor is preferably a stimulable phosphor giving off stimulated emission in the wavelength region of 300 to 500 nm when exposed to a stimulating light in the wavelength region of 400 to 900 nm.

The phosphor is preferably an alkali metal halide stimulable phosphor represented by the following formula (I):

$$M^I X \cdot aM^{II}X'_2 \cdot bM^{III}X''_3 : zA \qquad (I)$$

in which $M^I$ is at least one alkali metal selected from the group consisting of Li, Na, K, Rb and Cs; $M^{II}$ is at least one alkaline earth metal or divalent metal selected from the group consisting of Be, Mg, Ca, Sr, Ba, Ni, Cu, Zn and Cd; $M^{III}$ is at least one rare earth element or trivalent metal selected from the group consisting of Sc, Y, La, Ce, Pr, Nd, Pm, Sm, Eu, Gd, Tb, Dy, Ho, Er, Tm, Yb, Lu, Al, Ga and In; each of X, X' and X" is independently at least one halogen selected from the group consisting of F, Cl, Br and I; A is at least one rare earth element or metal selected from the group consisting of Y, Ce, Pr, Nd, Sm, Eu, Gd, Tb, Dy, Ho, Er, Tm, Yb, Lu, Mg, Cu and Bi; and a, b and z are numbers satisfying the conditions of $0 \leq a < 0.5$, $0 \leq b < 0.5$ and $0 < z < 1.0$, respectively.

In the formula (I), z preferably is a number satisfying the condition of $1 \times 10^{-4} \leq z \leq 0.1$; $M^I$ preferably comprises at least Cs; X preferably comprises at least Br; and A is preferably Eu or Bi, more preferably Eu. The phosphor represented by the formula (I) may further comprise, if needed, metal oxides such as aluminum oxide, silicon dioxide and zirconium oxide as additives in an amount of 0.5 mol or less based on 1 mol of $M^I X$.

As the phosphor, it is also preferred to use a rare earth activated alkaline earth metal fluoride halide stimulable phosphor represented by the following formula (II):

$$M^{II}FX:zLn \qquad (II)$$

in which $M^{II}$ is at least one alkaline earth metal selected from the group consisting of Ba, Sr and Ca; Ln is at least one rare earth element selected from the group consisting of Ce, Pr, Sm, Eu, Tb, Dy, Ho, Nd, Er, Tm and Yb; X is at least one halogen selected from the group consisting of Cl, Br and I; and z is a number satisfying the condition of $0 < z \leq 0.2$.

Also preferred is a rare earth activated alkaline earth metal sulfide stimulable phosphor represented by the following formula (III):

$$M^{II}S:A,Sm \qquad (III)$$

in which $M^{II}$ is at least one alkaline earth metal selected from the group consisting of Mg, Ca and Sr; and A is preferably Eu and/or Ce.

Further, yet another preferred phosphor is a cerium activated trivalent metal oxide halide stimulable phosphor represented by the following formula (IV):

$$M^{III}OX:Ce \qquad (IV)$$

in which $M^{III}$ is at least one rare earth element or trivalent metal selected from the group consisting of Pr, Nd, Pm, Sm, Eu, Tb, Dy, Ho, Er, Tm, Yb and Bi; and X is at least one halogen selected from the group consisting of Cl, Br and I.

The phosphor used in the invention is not restricted to the energy-storing phosphor. It may be a phosphor absorbing radiation such as X-rays and instantly giving off (instant) emission in the ultraviolet or visible resin. Examples of the phosphors include phosphors of $LnTaO_4$:(Nb, Gd) type, $Ln_2SiO_5$:Ce type and LnOX:Tm type (Ln is a rare earth element); CsX (X is a halogen) type; $Gd_2O_2S$:Tb; $Gd_2O_2S$:Pr,Ce; $ZnWO_4$; $LuAlO_3$:Ce; $Gd_3Ga_5O_{12}$:Cr,Ce; and $HfO_2$.

In the manufacture of the radiation image storage panel of the invention, first the subbing layer, which comprises matrix compound of the phosphor, is formed on the substrate surface beforehand treated in the aforementioned manner. The subbing layer is generally formed according to a gas phase-accumulation method such as a vapor-deposition process, a sputtering process or a chemical vapor deposition (CVD) process. It is preferred to form the subbing and phosphor layers successively. For example, if the vapor-deposition process is adopted, the apparatus and conditions described later for forming the phosphor layer can be also applied to the formation of the subbing layer, so that the phosphor matrix compound is vaporized from an evaporation source and accumulated on the substrate surface. In that case, the evaporation source may be either the matrix compound itself or a mixture of substances that react with each other to produce the matrix compound when they are deposited on the substrate.

In that way, the substrate surface is covered with a subbing layer made of the phosphor matrix compound in the form of columnar crystals or agglomerate of spherical crystals.

On the formed subbing layer, a layer of deposited energy-storing phosphor is then formed. In the case that the phosphor layer is formed by multi-vapor deposition (co-deposition), at least two evaporation sources are used. One of the sources contains a matrix material of the energy-storing phosphor, and the other contains an activator material. The multi-vapor deposition is preferred because the vaporization rate of each source can be independently controlled to incorporate the activator uniformly in the matrix even if the materials have very different melting points or vapor pressures. According to the composition of the desired phosphor, each evaporation source may consist of the matrix material or the activator material only or otherwise may be a mixture thereof with additives. Three or more sources may be used.

The matrix material of the phosphor may be either the matrix compound itself or a mixture of two or more substances that react with each other to produce the matrix compound. The activator material generally is a compound containing an activating element, and hence is, for example, a halide or oxide of the activating element.

If the activator is Eu, the Eu-containing compound of the activator material preferably contains $Eu^{2+}$ as much as possible because the desired stimulated emission (even if, instant emission) is emitted from the phosphor activated by $Eu^{2+}$. Commercially available Eu-containing compounds are generally contaminated with oxygen and contain both $Eu^{2+}$ and $Eu^{3+}$. The Eu-containing compounds, therefore, are preferably melted under Br gas-atmosphere so that oxygen-free $EuBr_2$ can be prepared.

The evaporation source preferably has a water content of not more than 0.5 wt. %. For preventing the source from bumping, it is particularly important to control the water content to a level as low as possible if the material of matrix or activator is a hygroscopic substance such as EuBr or CsBr. The materials are preferably dried by heating at 100 to 300° C. under reduced pressure. Otherwise, the materials can be heated under dry atmosphere such as nitrogen gas atmosphere to melt at a temperature higher than the melting point for several minutes to several hours.

The evaporation source, particularly the source containing the matrix material, contains little impurities of alkali metal (alkali metals other than ones constituting the phosphor) preferably in a content of 10 ppm or less and impurities of alkaline earth metal (alkaline earth metals other than ones constituting the phosphor) preferably in a content of 5 ppm or less (by weight). That is particularly preferred if the phosphor is an alkali metal halide stimulable phosphor represented by the formula (I). Such preferred evaporation source can be prepared from materials containing little impurities.

The two or more evaporation sources and the substrate provided with the subbing layer (or substrate before the subbing layer is formed) are placed in a vacuum evaporation-deposition apparatus. The apparatus is then evacuated to give a medium vacuum of 0.1 to 10 Pa. The degree of vacuum is preferably set to a value in the range of 0.1 to 3 Pa. It is particularly preferred that, after the apparatus is evacuated to such a high vacuum of $1 \times 10^{-5}$ to $1 \times 10^{-2}$ Pa, an inert gas such as Ar, Ne or $N_2$ gas be introduced into the apparatus so that the inner pressure may be the above medium vacuum. In this way, partial pressures of water and oxygen can be reduced. The apparatus can be evacuated by means of an optional combination of, for example, a rotary pump, a turbo molecular pump, a cryo pump, a diffusion pump and a mechanical buster.

For heating the evaporation sources, electric currents are then supplied to resistance heaters. The sources of matrix and activator materials are thus heated, vaporized, reacted with each other to form the phosphor, which is deposited and accumulated on the subbing layer. The space between the substrate and each source depends upon various conditions such as the size of substrate, but generally is in the range of 10 to 1,000 mm, preferably in the range of 10 to 200 mm. The space between the sources generally is in the range of 10 to 1,000 mm. In this step, the substrate may be heated or cooled. The deposition rate, which means how fast the formed phosphor is deposited and accumulated on the substrate, can be controlled by adjusting the electric currents supplied to the heaters. The deposition rate (in terms of deposited weight rate) generally is adjusted to a level in the range of 1 to 15 mg/cm²·min.

Prior to the above-mentioned procedure for forming the deposited phosphor layer, only the phosphor matrix compound is preferably deposited to form a subbing layer. For example, a shutter is placed between the substrate and each source. First, only the shutter covering the source of matrix material is opened, so that only the matrix compound is deposited to form a subbing layer of the desired thickness. Subsequently, all the shutters are opened, so that the phosphor is deposited on the subbing layer.

The heating with resistance heaters may be repeated twice or more to form two or more phosphor layers. In the vapor-deposition procedure, the substrate may be heated or cooled. The temperature of the substrate generally is in the range of 20 to 350° C. After the deposition procedure is complete, the deposited layers are preferably subjected to heating treatment (annealing treatment).

In the case that the phosphor layer is produced by mono-vapor deposition, only one evaporation source is heated with a single resistance heater. The evaporation source is beforehand prepared so that it may contain the activator in the desired amount. Otherwise, in consideration of the difference of vapor pressure between the matrix component and the activator, the deposition procedure may be carried out while the matrix component is being supplied to the evaporation source.

The produced phosphor layer essentially consists of phosphor in the form of columnar crystals grown almost in the thickness direction. In the invention, the subbing layer made of the phosphor matrix compound is provided between the support and the phosphor layer. Because of this subbing layer, the phosphor layer is excellent in adhesion to the support even when it contains an activator in a relatively high content. The columnar crystals of the phosphor, therefore, are fixed firmly enough not to peel off.

The produced phosphor layer consists of the energy-storing phosphor and contains no binder, and there are produced gaps among the phosphor columnar crystals. The thickness of the phosphor layer depends on, for example, the desired characteristics of the storage panel, conditions and process of the deposition, but generally is in the range of 100 µm to 1 mm, preferably in the range of 200 to 700 µm.

The gas phase-accumulation method employable in the invention is not restricted to the above-described vapor-deposition process, and various other known processes such as a sputtering process and a CVD process can be used.

On the energy-storing phosphor layer, a protective layer is preferably provided to ensure good handling of the storage panel in transportation and to avoid deterioration. The protective layer is preferably transparent so as not to prevent the stimulating light from coming in or not to prevent the emission from coming out. Further, for protecting the storage panel from chemical deterioration and physical damage, the protective layer is preferably chemically stable, physically strong, and of high moisture proof.

The protective layer can be provided by coating the phosphor layer with a solution in which a transparent organic polymer (e.g., cellulose derivatives, polymethyl methacrylate, fluororesins soluble in organic solvents) is dissolved in an appropriate solvent, by placing a beforehand prepared sheet as the protective layer (e.g., a film of organic polymer such as polyethylene terephthalate) on the phosphor layer with an adhesive, or by depositing vapor of inorganic compounds on the phosphor layer. Various additives may be contained in the protective layer. Examples of the additives include light-scattering fine particles (e.g., particles of magnesium oxide, zinc oxide, titanium dioxide, and alumina), a slipping agent (e.g., powders of perfluoroolefin resin and silicone resin), and a crosslinking agent (e.g., polyisocyanate). The thickness of the protective layer generally is in the range of about 0.1 to 20 µm in the case that the protective layer is made of polymer material or in the range of about 100 to 1,000 µm in the case of the protective layer is made of inorganic material such as silicate glass.

For enhancing the resistance to stain, a fluororesin coating layer may be provided on the protective layer.

In the way described above, the radiation image storage panel of the invention can be produced. The storage panel of the invention may be in known various structures. For example, in order to improve the sharpness of the resultant image, at least one of the layers may be colored with a colorant which does not absorb the stimulated emission but the stimulating light.

EXAMPLE 1

(1) Evaporation Source

As the evaporation sources, powdery cesium bromide (CsBr, purity: 4N or more) and powdery europium bromide (EuBr$_2$, purity: 3N or more) were prepared. Each evaporation source was analyzed according to ICP-MS method (Inductively Coupled Plasma Mass Spectrometry), to check impurities. As a result, the CsBr powder was found to contain each of the alkali metals (Li, Na, K, Rb) other than Cs in an amount of 10 ppm or less and other elements such as alkaline earth metals (Mg, Ca, Sr, Ba) in amounts of 2 ppm or less. The EuBr$_2$ was also found to contain each of the rare earth elements other than Eu in an amount of 20 ppm or less and other elements in amounts of 10 ppm or less. These evaporation sources are very hygroscopic, and hence were stored in a desiccator keeping a dry condition whose dew point was −20° C. or below. Immediately before the evaporation sources are used, they were taken out of the desiccator.

(2) Surface Treatment of Support and Formation of Subbing Layer

An aluminum substrate (support, thickness: 1 mm) was washed successively with an aqueous alkaline solution, purified water, and isopropyl alcohol. The treated substrate was mounted to a substrate holder in an evaporation-deposition apparatus. The CsBr and EuBr$_2$ evaporation sources were individually placed in crucibles equipped with resistance heaters, respectively. The space between the substrate and each source was 15 cm. The apparatus was then evacuated to make the inner pressure $1\times10^{-3}$ Pa by means a combination of a rotary pump, a mechanical booster and a turbo molecular pump, and successively Ar gas (purity: 5N) was introduced to set the inner pressure (Ar gas pressure) at $8\times10^{-2}$ Pa. In the prepared atmosphere, Ar plasma was generated by means of a plasma-generator (ion gun) [50V, 60 A], so that the substrate was subjected to RF plasma treatment for 10 minutes. Subsequently, the apparatus was again evacuated to set the inner pressure to $1\times10^{-3}$ Pa, and successively Ar gas was introduced again to set the inner pressure (Ar gas pressure) at 3 Pa. The substrate was then heated to 100° C. by means of a sheath heater placed on the back side (the opposite-side to the face which the vapor is to be deposited on). While a shutter placed between the substrate and each source is kept closed, each evaporation source was heated by means of the resistance heater. The shutter covering the CsBr source was then opened, so that CsBr (matrix compound) was alone accumulated on the substrate at a rate of 5.0 mg/cm$^2$·min. to form a subbing layer (thickness: 50 µm). The relative density of the formed subbing layer was 70%.

(3) Formation of Phosphor Layer

The apparatus was once again evacuated to set the inner pressure to $1\times10^{-3}$ Pa, and successively Ar gas was introduced to set the inner pressure (Ar gas pressure) to 1 Pa. The substrate was then heated to 100° C. While all the shutters are kept closed, each evaporation source was heated by means of the resistance heater. Both shutters covering the CsBr and EuBr$_2$ sources were then opened, so that stimulable CsBr:Eu phosphor was accumulated on the subbing layer at a rate of 5.0 mg/cm$^2$·min. During the deposition was carried out, the electric currents supplied to the heaters were controlled so that the molar ratio of Eu/Cs in the stimulable phosphor would become $8\times10^{-4}/1$. After the evaporation-deposition was complete, the inner pressure was returned to atmospheric pressure and then the substrate was taken out of the apparatus. On the subbing layer having been provided on the substrate, a phosphor layer (thickness: 500 µm, area: 10 cm×10 cm) was formed. The formed phosphor layer consisted of the phosphor in the form of columnar crystals grown almost perpendicularly and aligned densely.

Thus, a radiation image storage panel (FIG. 1) of the invention composed of a support, a subbing layer and a phosphor layer was produced by the co-deposition process.

EXAMPLES 2 TO 6

The procedures of Example 1 were repeated except that the period of the plasma treatment, the temperature of substrate measured when the subbing layer was formed thereon, and the degree of vacuum in the step (2) were changed to the values shown in Table 1, to produce various radiation image storage panels according to the invention.

COMPARISON EXAMPLE 1

The procedures of Example 1 were repeated except that the substrate was not subjected to the plasma treatment and that the subbing layer was not formed in the step (2), to produce a radiation image storage panel comprising a support and a phosphor layer for comparison.

COMPARISON EXAMPLES 2 TO 6

The procedures of Example 1 were repeated except that the period of the plasma treatment, the temperature of substrate measured when the subbing layer was formed thereon, and the degree of vacuum in the step (2) were changed to levels set forth in Table 1, to produce various radiation image storage panels for comparison.

Evaluation of Radiation Image Storage Panel

With respect to each produced storage panel, the adhesion strength and the sensitivity were evaluated in the following manner.

(1) Adhesion Strength

The adhesion of each produced storage panel was evaluated in accordance with the Scotch tape method described in "Handbook of formation, evaluation and application of thin film [in Japanese]", ed. S. Gonda, Fuji-techno system, 1984, pp. 211.

An adhesive tape (available from Nichiban Co., Ltd.) was stuck on the surface of the phosphor layer, and then peeled to make the phosphor layer (and the subbing layer) come off the support. A level that how much the phosphor layer (and the subbing layer) came off was observed, and thereby the adhesion was evaluated. This test was repeated five times, and the adhesion strength of each panel was evaluated on the basis of the average value. The evaluated adhesion strength was expressed in terms of relative value. The adhesion strength of Comparison Example 1, in which the phosphor layer separated the most, was defined as 1.0 while that of Example 2, in which the phosphor layer came off the least, was defined as 5.0.

(2) Sensitivity

Each radiation image storage panel was encased in a room light-shielding cassette and then exposed to X-rays (voltage: 80 kVp, current: 16 mA). The storage panel was then taken out of the cassette and stimulated with a He—Ne laser beam (wavelength: 633 nm), and the emitted stimulated emission was sequentially detected by a photomultiplier. From the detected stimulated emission intensity (converted into a relative value based on the intensity of Comparison Example 1), the sensitivity was evaluated.

(3) Results

The results are set forth in Table 1, in which the contact angle θ of the phosphor layer-side surface of the support against water and the relative densities of base and phosphor layers are also shown.

TABLE 1

| Ex. | Support | | Subbing layer | | | |
|---|---|---|---|---|---|---|
| | Treating time | θ (°) | Temp. of substrate | Vacuum (Pa) | Thickness | Density (%) |
| Ex. 1 | 10 min. | 15 | 100° C. | 3 | 50 μm | 70 |
| Ex. 2 | 10 min. | 15 | 100° C. | 1 | 50 μm | 65 |
| Ex. 3 | 10 min. | 15 | 100° C. | 0.3 | 50 μm | 60 |
| Ex. 4 | 10 min. | 15 | 250° C. | 1 | 50 μm | 95 |
| Ex. 5 | 20 sec. | 46 | 100° C. | 3 | 50 μm | 70 |
| Ex. 6 | 3 min. | 30 | 100° C. | 3 | 50 μm | 70 |
| Ex. 7 | 10 min. | 15 | 100° C. | 3 | 50 μm | 70 |
| Com. 1 | — | 58 | — | — | — | — |
| Com. 2 | 30 min. | 15 | 100° C. | 10 | 50 μm | 55 |
| Com. 3 | 30 min. | 15 | 100° C. | $1 \times 10^{-3}$ | 50 μm | 99 |
| Com. 4 | 30 min. | 15 | 300° C. | 1 | 50 μm | 99 |
| Com. 5 | 10 sec. | 52 | 100° C. | 3 | 50 μm | 70 |

| Ex. | Phosphor layer | | Evaluation | |
|---|---|---|---|---|
| | Temp. of substrate | Vacuum (Pa) | Adhesion | Sensitivity |
| Ex. 1 | 100° C. | 1 | 2.8 | 197 |
| Ex. 2 | 100° C. | 1 | 5.0 | 192 |
| Ex. 3 | 100° C. | 1 | 4.6 | 153 |
| Ex. 4 | 100° C. | 1 | 2.6 | 153 |
| Ex. 5 | 100° C. | 1 | 2.3 | 197 |
| Ex. 6 | 100° C. | 1 | 3.9 | 197 |
| Ex. 7 | 100° C. | 1 | 5.0 | 197 |
| Com. 1 | 100° C. | 1 | 1.0 | 100 |
| Com. 2 | 100° C. | 1 | 1.8 | 170 |
| Com. 3 | 100° C. | 1 | 1.3 | 165 |
| Com. 4 | 100° C. | 1 | 1.3 | 165 |
| Com. 5 | 100° C. | 1 | 1.9 | 185 |

Remark:

All the phosphor layers have the same thickness of 500 μm and the same relative density of 90%.

The results shown in Table 1 clearly indicate that each storage panel of the invention (Examples 1 to 6), in which the subbing layer made of the phosphor matrix compound (CsBr) was provided on the support surface showing a contact angle (to water) of less than 50°, had very strong adhesion between the phosphor layer and the support, and had remarkably improved sensitivity, as compared with the storage panel of Comparison Example 1, in which the subbing layer was not provided. Further, each storage panel of the invention had much stronger adhesion between the phosphor layer and the support than each storage panel for comparison (Comparison Examples 2 to 4), in which the subbing layer had a relative density of less than 60% or of more than 98%, and than the other storage panel for comparison (Comparison Example 5), in which the support surface showed a contact angle of higher than 50°.

What is claimed is:

1. A radiation image storage panel comprising a phosphor layer composed of a phosphor matrix compound and an activator in combination, a subbing layer composed of the phosphor matrix compound, and a support in order, the subbing layer and phosphor layer having been formed by a gas phase-accumulation method, wherein the subbing layer has a relative density of 60% to 98%, and a surface of the support facing the subbing layer shows a contact angle of less than 50° to water.

2. The radiation image storage panel of claim 1, wherein the relative density of the subbing layer is lower than a relative density of the phosphor layer.

3. The radiation image storage panel of claim 1, wherein the subbing layer has a relative density of lower than 96%.

4. The radiation image storage panel of claim 1, wherein the subbing layer has a relative density of lower than 80%.

5. The radiation image storage panel of claim 1, wherein each of the phosphor layer and the subbing layer has a thickness satisfying the condition of: 0.01<(thickness of subbing layer/thickness of phosphor layer)<0.5.

6. The radiation image storage panel of claim 1, wherein the surface of the support shows a contact angle of less than 20° to water.

7. The radiation image storage panel of claim 1, wherein the support is an aluminum sheet.

8. The radiation image storage panel of claim 7, wherein the aluminum sheet has been treated with plasma discharge.

9. The radiation image storage panel of claim 1, wherein the phosphor is an energy-storing phosphor.

10. The radiation image storage panel of claim 9, wherein the energy-storing phosphor is an alkali metal halide stimulable phosphor represented by the following formula (I):

$$M^{I}X \cdot aM^{II}X'_2 \cdot bM^{III}X''_3 : zA$$

in which $M^I$ is at least one alkali metal selected from the group consisting of Li, Na, K, Rb and Cs; $M^{II}$ is at least one alkaline earth metal or divalent metal selected from the group consisting of Be, Mg, Ca, Sr, Ba, Ni, Cu, Zn and Cd; $M^{III}$ is at least one rare earth element or trivalent metal selected from the group consisting of Sc, Y, La, Ce, Pr, Nd, Pm, Sm, Eu, Gd, Tb, Dy, Ho, Er, Tm, Yb, Lu, Al, Ga and In; each of X, X' and X" is independently at least one halogen selected from the group consisting of F, Cl, Br and I; A is at least one rare earth element or metal selected from the group consisting of Y, Ce, Pr, Nd, Sm, Eu, Gd, Tb, Dy, Ho, Er, Tm, Yb, Lu, Mg, Cu and Bi; and a, b and z are numbers satisfying the conditions of $0 \leq a < 0.5$, $0 \leq b < 0.5$ and $0 < z < 1.0$, respectively.

11. The radiation image storage panel of claim 10, wherein $M^I$, X, A and z in the formula (I) are Cs, Br, Eu and a number satisfying the condition of $1 \times 10^{-4} \leq z \leq 0.1$, respectively.

* * * * *